US007272690B2

(12) United States Patent
Groves et al.

(10) Patent No.: US 7,272,690 B2
(45) Date of Patent: Sep. 18, 2007

(54) METHOD AND SYSTEM FOR ASSIGNING A RESOURCE

(75) Inventors: David W. Groves, San Jose, CA (US); Michael L. Lamb, San Jose, CA (US); Douglas S. Noddings, Export, PA (US); Raymond M. Swank, San Jose, CA (US); Kevin J. Webster, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 10/739,209

(22) Filed: Dec. 17, 2003

(65) Prior Publication Data

US 2005/0138316 A1    Jun. 23, 2005

(51) Int. Cl.
*G06F 12/00*    (2006.01)
(52) U.S. Cl. .................. 711/147; 711/114; 711/112
(58) Field of Classification Search ............... None
See application file for complete search history.

(56) References Cited

U.S. PATENT DOCUMENTS

| 6,044,369 | A | 3/2000 | Black |
| 6,345,368 | B1 | 2/2002 | Bergsten |
| 6,389,432 | B1 | 5/2002 | Pothapragada et al. |
| 6,427,168 | B1 | 7/2002 | McCollum |
| 6,560,591 | B1 | 5/2003 | Memmott et al. |
| 6,697,924 | B2 * | 2/2004 | Swank ................ 711/163 |
| 7,099,904 | B2 * | 8/2006 | Nakatsuka ............ 707/205 |
| 2002/0013808 | A1 | 1/2002 | Case et al. |
| 2002/0107872 | A1 | 8/2002 | Hudis et al. |
| 2002/0112043 | A1 | 8/2002 | Kagami et al. |
| 2002/0184360 | A1 | 12/2002 | Weber et al. |
| 2003/0055808 | A1 | 3/2003 | Bhat |
| 2003/0093509 | A1 | 5/2003 | Li et al. |

OTHER PUBLICATIONS

"Managing A Storage Array Using CIM Schema 2.7", Revision 0.14, Work-in-Progress Draft, Sep. 13, 2002, pp. 1-35, Storage Networking Industry Association, San Francisco.
"SNIA Storage Management Initative Specification Version 1.0.1", Sep. 12, 2003, pp. 1-644, Storage Networking Industry Association, San Francisco.
"CIM Tutorial", Jun. 13, 2003, pp. 1-105, Distributed Management Task Force, Portland.
Lamb et al., U.S. Appl. No. 10/739,228, titled "CIM Utilities", filed Dec. 17, 2003, 25 pages plus 4 drawing sheets.
Groves et al., U.S. Appl. No. 10/739,136, titled "Method and system for assigning or creating a resource", filed Dec. 17, 2003, 33 pages plus 6 drawing sheets.

* cited by examiner

*Primary Examiner*—T Nguyen
(74) *Attorney, Agent, or Firm*—Timothy N. Ellis

(57) ABSTRACT

An example of a method for assigning storage includes receiving a request for storage, wherein the request includes a requested amount of storage space and connectivity information. This example of the method also includes identifying storage that is accessible by a requesting device based on the connectivity information, and identifying all LUNs that are masked from all hosts, in the identified storage. This example of the method further includes selecting at least one identified LUN, and assigning the at least one selected LUN to the requesting device.

22 Claims, 3 Drawing Sheets

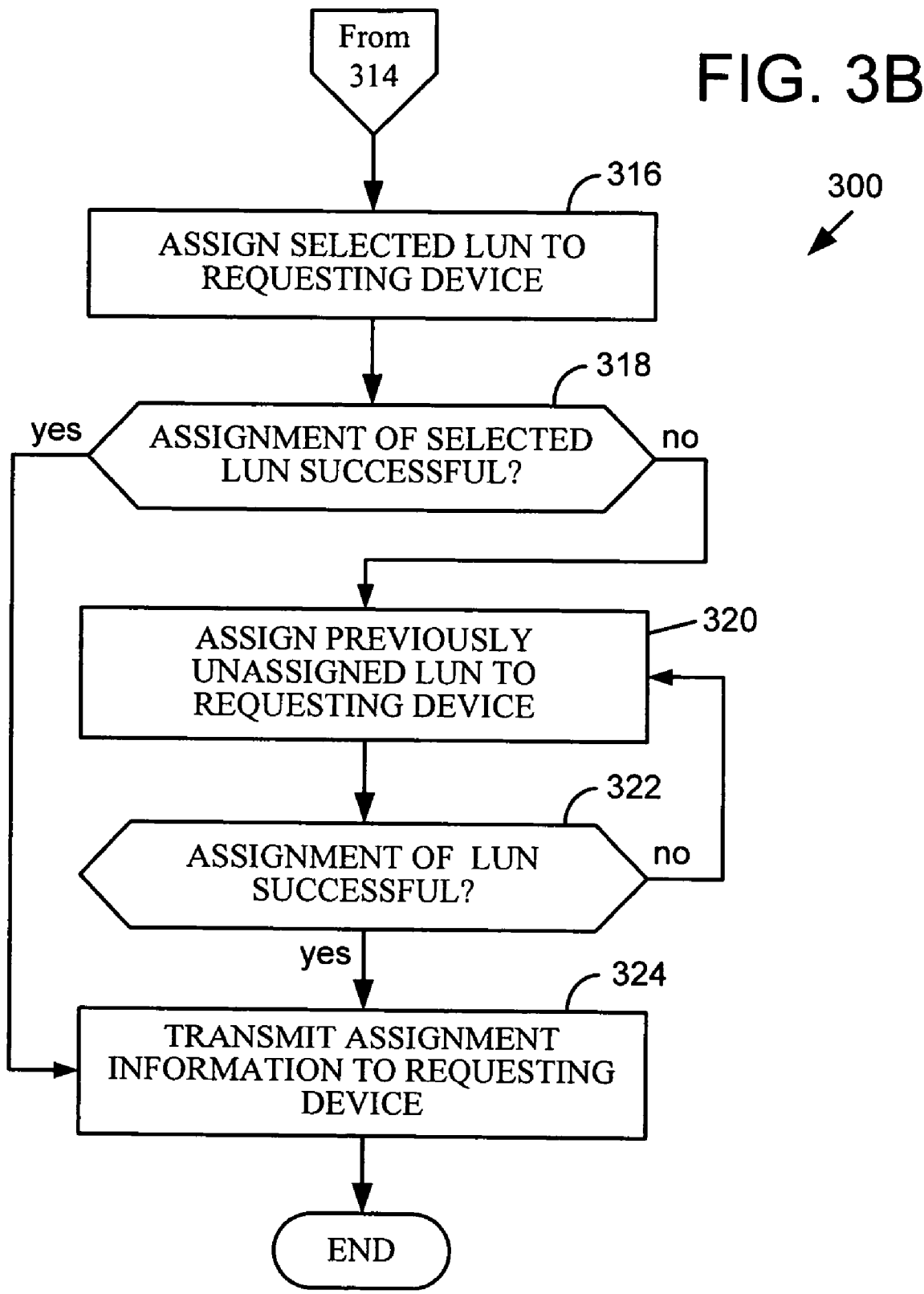

METHOD AND SYSTEM FOR ASSIGNING A RESOURCE

BACKGROUND

1. Technical Field

The present invention relates to management and control of resources in a computing system. More particularly, the invention concerns assigning a resource, such as storage, to a device, such as a host computer.

2. Description of Related Art

Modern computing systems frequently utilize a large number of computing devices, storage devices, and other components. In a common implementation, a Storage Area Network (SAN) is used to connect computing devices with a large number of storage devices. Management and modeling programs may be used to manage these complex computing environments.

Storage Management Initiative Specification (SMI-S)/Bluefin, and Common Information Model (CIM) technologies, are widely used for managing storage devices and storage environments. The SMI-S is a standard management interface that allows different classes of hardware and software products to interoperate for monitoring and controlling resources. For example, the SMI-S permits storage management systems to identify, classify, monitor, and control physical and logical resources in a SAN. The SMI-S is based on CIM, and Web-Based Enterprise Management (WBEM) architecture. CIM is a model for describing management information, and WBEM is an architecture for using Internet technologies to manage systems and networks. The SMI-S uses CIM to define objects that represent storage entities such as Logical Unit Numbers (LUNs), Disks, Storage Subsystems, Switches, and host Computer Systems. (In many, but not all cases, the term "volume" is interchangeable with the term "LUN".) CIM also defines the associations that may or may not exist between these objects, such as a Disk being associated to a Storage Subsystem because it physically resides in the Storage Subsystem.

The CIM Objects mentioned above may be managed by a CIM Object Manager (CIMOM). A storage management software application, such as IBM Tivoli Storage Resource Manager (ITSRM), can use a CIM Client to connect to a CIMOM, to retrieve information about the storage entities that the CIMOM manages, and also to perform active configuration of the storage entities. Storage management software that uses a CIM Client may be called a CIM Client Application.

The SMI-S/Bluefin describes how a current storage LUN is mapped. However, the Logical Unit Number (LUN) Masking and Mapping Profile evolved rapidly from the time that the Bluefin Specification was developed to the present version, which is defined in the SMI-S Public Review Draft SMI-S Version 1.0. As a consequence of the rapid evolution, ITSRM 1.2 and the IBM ESS CIM Server for the IBM Enterprise Storage Server (ESS) support a version of the LUN Masking and Mapping Profile that was "captured" between the Profile's Bluefin definition and the Profile's SMI-S definition. (A CIM Server is a CIMOM and a set of CIM Providers.) Consequently, the IBM ESS CIM Server uses a different masking algorithm than described in the latest SMI-S/Bluefin specification, and different associations are made to map a storage LUN to a particular host. These differences can result in complexity and difficulties, as illustrated in the following paragraph.

It is often important for a CIM Client Application to be able to locate available, masked, or unassigned storage LUNs in a disk storage system. However, the complexity of the CIM object model makes it difficult for a CIM Client Application to simply locate the available, masked, or unassigned storage LUNs. The following steps must be taken to determine the Hosts that have read/write access to a specific LUN, and to determine the target Fibre Channel Ports (FCPorts) that are mapped to allow this access, when using the LUN Masking Mapping Model defined in the Bluefin Specification and it's supplemental Whitepapers. These steps exemplify the complexity of the SMI-S/Bluefin LUN Masking and Mapping Model:

1. Get the Controllers that are associated to the LUN through the ControlledBy association.
2. Filter the list of Controllers to only contain Controllers whose AuthorizationView property is equal to "true".
3. For each Controller in the filtered list, obtain the FCPorts that are mapped to the Controller by using the ConcreteIdentity association.
4. For each Controller in the filtered list, get the AccessControlInformation object that is associated to the Controller by the AuthorizationTarget association.
5. Check that the AccessControlInformation allows 'Read/write' access.
6. For each read/write AccessControlInformation, get the HardwareAccount objects using the AuthorizationSubject association. Each HardwareAccount object represents a host or HBA on a host that has read/write access to the LUN through the FCPorts found in step 3.

Thus, a large number of complex and time consuming steps must be performed, and consequently, known techniques for using a CIM Client Application to locate available, masked, or unassigned storage LUNs in a disk storage system are inadequate.

SUMMARY

One aspect of the invention is a method for assigning storage. An example of the method includes receiving a request for storage, wherein the request includes a requested amount of storage space and connectivity information. This example of the method also includes identifying storage that is accessible by a requesting device based on the connectivity information, and identifying all LUNs that are masked from all hosts, in the identified storage. This example of the method further includes selecting at least one identified LUN, and assigning the at least one selected LUN to the requesting device.

Other aspects of the invention are described in the sections below, and include, for example, a computing system, and a signal bearing medium tangibly embodying a program of machine-readable instructions executable by a digital processing apparatus to perform a method for assigning storage.

Some examples of the invention provide one or more of the following advantages: (1) A CIM Client Application does not need to have knowledge of the CIM objects and their associations in the CIMOM (in other words, a higher level client does not need to understand CIM objects required for LUN selection); (2) Parameters used by the higher level client to create LUNs are simplified; (3) Retryable errors are not required to be handled by a higher level client; and (4) Multiple selection requests are allowed by the higher level client. Some examples of the invention also provide a number of other advantages and benefits, which should be apparent from the following description.

BRIEF DESCRIPTION OF THE DRAWINGS

FIGS. 3A and 3B are a flowchart of an operational sequence for assigning storage in accordance with an example of the invention.

DETAILED DESCRIPTION

Figure 1:
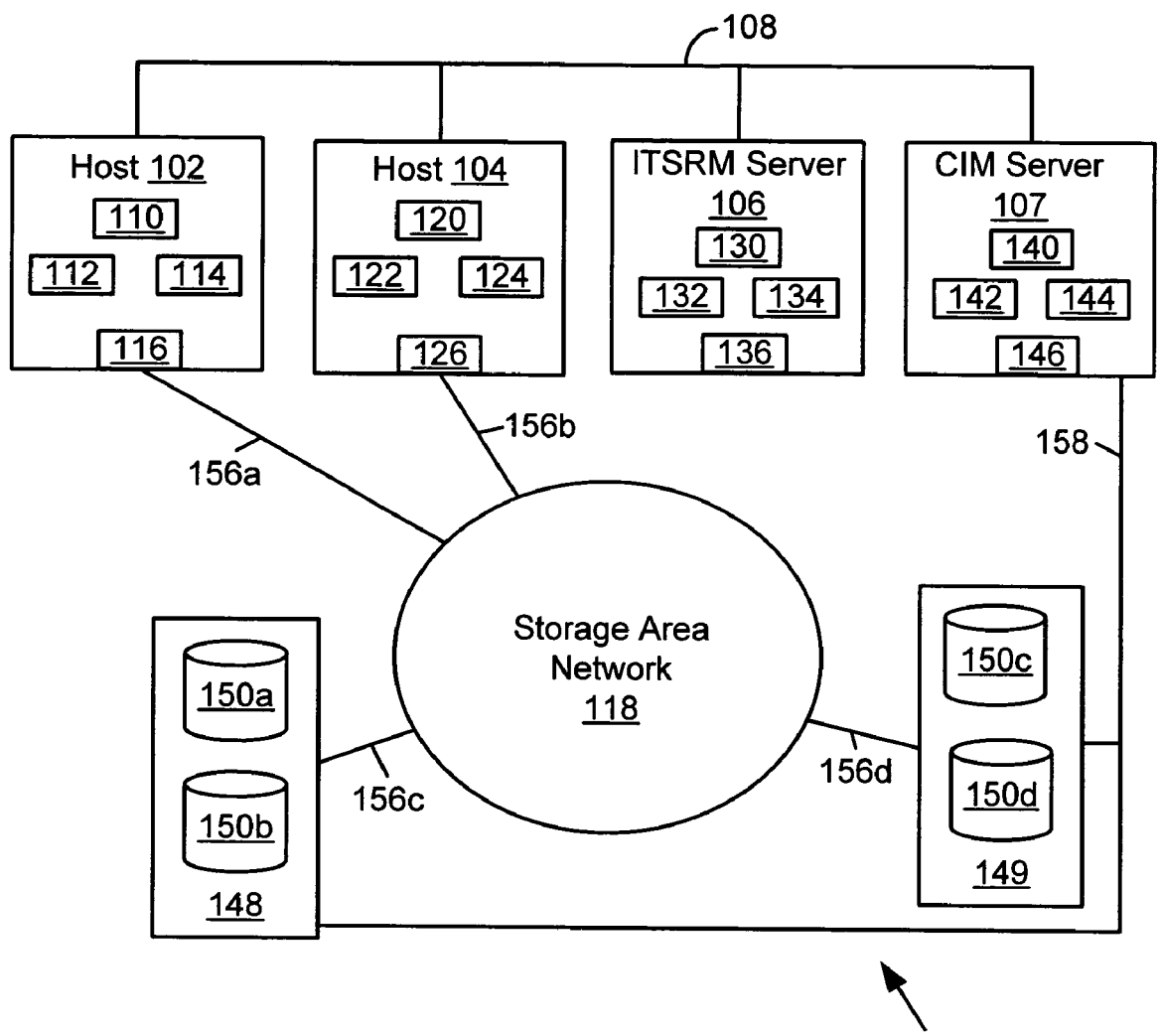
FIG. 1 is a block diagram of the hardware components and interconnections of a computing system in accordance with an example of the invention.

The nature, objectives, and advantages of the invention will become more apparent to those skilled in the art after considering the following detailed description in connection with the accompanying drawings.

I. Hardware Components and Interconnectons

One aspect of the invention is a computing system that can be used for assigning storage, or more generally, for assigning a resource to a requesting device. As an example, the computing system may be embodied by all, or portions of, the computing system 100 shown in FIG. 1. The computing system 100 includes a first host 102 and a second host 104. Alternatively, only one host could be included, or additional hosts could be included, and client computers could be included. The computing system 100 also includes an ITSRM server 106, and a CIM Server 107 (which may also be called a CIM Object Manager (CIMOM)). Each host 102, 104, ITSRM server 106, and the CIM server 107 may run the same or different operating systems, which could be any suitable operating system(s), for example, Windows 2000, AIX, Solaris™, Linux, UNIX, or HP-UX™. Each host 102, 104, ITSRM server 106, and the CIM server 107 may be implemented with any suitable computing device, and may be implemented with the same, or different computing devices. As an example, host 102, host 104, ITSRM server 106, and the CIM server 107 could be a personal computer (having for example, an Intel processor running the Windows or Linux operating system), a computer workstation, a mainframe computer, a supercomputer (for example an IBM SP2 running the AIX operating system), or any other suitable computing device running any suitable operating system. In other examples, the host 102, host 104, ITSRM server 106, and the CIM server 107 could be an IBM xSeries server, or an IBM zSeries Parallel Sysplex server, such as a zSeries 900, running the z Operating System (z/OS), or an IBM S/390 server running OS/390. Host 102, host 104, ITSRM server 106, and/or CIM server 107 could also run Tivoli Storage Manager (TSM), which is available from IBM Corporation. The hosts 102, 104, ITSRM server 106, and the CIM server 107 may be coupled to each other with a network 108, which may be an IP network, and which could be any suitable type of network, for example, an Ethernet network, an ESCON network, a wireless network, or the Internet. The hosts 102, 104 need not be coupled to the CIM server 107 via the network 108.

The host 102 has a processor 110 (which may be called a processing device), and in some examples could have more than one processor. As an example, the processor 110, may be a PowerPC RISC processor or an IBM P690 power 4 processor, available from International Business Machines Corporation. In another example, the processor 110 could be a processor manufactured by Intel Corporation. The host 102 also may have a memory subsystem that may include a primary memory 112 (for example RAM), and/or a non-volatile memory 114, both of which are coupled to the processor 110. The memory subsystem may be used to store data and application programs and/or other programming instructions executed by the processor 110. The application programs could generally be any suitable applications. The non-volatile memory 114 could be, for example, a hard disk drive, a drive for reading and writing from optical or magneto-optical media, a tape drive, non-volatile RAM (NVRAM), or any other suitable type of storage. In some examples the primary memory 112 or the non-volatile memory 114 could be eliminated, or the primary memory 112 and/or the non-volatile memory 114 could be provided on the processor 110, or alternatively, external from the host 102. The host 102 also has a hardware bus adapter (HBA) 116, for coupling the host 102 to a Fibre Channel network that may be used to implement the SAN 118. The Fibre Channel network may be call the "fabric". As an example, the hardware bus adapter 116 could be a model 2200 hardware bus adapter available from QLogic Corporation.

Similar to host 102, host 104 has a processor 120, a memory subsystem that may include a primary memory 122 (for example RAM), and/or a non-volatile memory 124, both of which are coupled to the processor 120. The memory subsystem may be used to store data and application programs and/or other programming instructions executed by the processor 120. The application programs could generally be any suitable applications. The host 104 also has a hardware bus adapter 126, for coupling the host 104 to the Fibre Channel network that may be used to implement the SAN 118.

Similar to hosts 102 and 104, ITSRM server 106 has a processor 130, a memory subsystem that may include a primary memory 132(for example RAM), and/or a non-volatile memory 134, both of which are coupled to the processor 130. The memory subsystem may be used to store data and application programs and/or other programming instructions executed by the processor 130. The application programs could generally be ITSRM and any other suitable applications. In one example, an example of the "service" of the invention runs on the ITSRM server 106. Some aspects of the invention are referred to herein as a "service". The functions performed by the aspects of the invention that are referred to as a "service" may encompass more than what is traditionally performed by a service, and consequently when referring to the invention, the term "service" may encompass more than what is traditionally performed by a service. ITSRM server 106 also may have a hardware bus adapter 136, for coupling the ITSRM server 106 to the Fibre Channel network that may be used to implement the SAN 118. However, as shown in FIG. 1, the ITSRM server 106 need not be coupled to the SAN 118. In an alternative embodiment, an ITSRM server need not be included in the computing system 100.

Similar to hosts 102 and 104, and ITSRM server 106, CIM server 107 has a processor 140, a memory subsystem that may include a primary memory 142 (for example RAM), and/or a non-volatile memory 144, both of which are coupled to the processor 140. The memory subsystem may be used to store data and application programs and/or other programming instructions executed by the processor 140. The application programs could generally be a CIM Object Manager program, and any other suitable applications. CIM server 107 may also have a hardware bus adapter 146, for coupling the CIM server 107 to the Fibre Channel network that may be used to implement the SAN 118. However, as shown in FIG. 1, the CIM server 107 need not be coupled to the SAN 118. In an alternative embodiment, SCSI protocol, rather than Fibre Channel protocol, could be used to couple the host 102, the host 104, ITSRM server 106 and/or CIM server 107 to the SAN 118. In alternative embodiments, the CIM Server 107 could be embedded in another device, such as, for example, a storage system 148 or 149 discussed below. Also, more than one CIM server could be included in the computing system 100.

The computing system 100 also may include a storage system 148 and storage system 149. Storage devices 150a-b are included in storage system 148, and storage devices 150c-d are included in storage system 149. The storage systems 148, 149 could include additional storage devices. Generally, a large number of storage systems may be coupled to the SAN 118. Storage devices that are not in storage systems could be coupled directly to the SAN 118, or could be coupled to the SAN 118 through a switch (not shown). The storage devices 150a-d are coupled to the hosts 102, 104 through the SAN 118, via Fibre Channel network branches 156a-d. The CIM server 107 is coupled to the storage system 148, 149 via the network 158, which may be an IP network, and which could be any suitable type of network, for example, an Ethernet network, an ESCON network, a wireless network, or the Internet. Each storage system 148, 149 has a storage controller (not shown) and is connected to the SAN 118 through a network adapter (not shown). There may be multiple paths to the storage systems 148, 149 in the SAN 118. In alternative embodiments, computing environments that include storage systems but that do not include a SAN could be used. Fibre Channel connections will generally be used to couple storage devices to hosts. However, other types of connections could be used.

The plurality of storage devices 150a-d may include, for example, hard drives. However, each of the storage devices in the plurality of storage devices could be implemented with any suitable type of storage device, using any suitable technology, such as magnetic, optical, magneto-optical, or electrical. For example, suitable storage devices could include hard disk drives, optical disks or discs (for example, CD-RW, DVD-RW, or DVD+RW), floppy disks, magnetic data storage disks or diskettes, magnetic tape, digital optical tape, a tape library, EPROMs, EEPROMs, RAM, Non-Volatile RAM, and flash memory. Additionally, CD-R, WORM, DVD-R, and/or DVD+R devices could be included in the plurality storage devices. As an example, one or more of the storage systems 148, 149 could be implemented with a Model F20 or Model 800 Enterprise Storage Server, available from IBM Corporation. As another example, disk storage could be implemented with an IBM FAStT 900, and a tape library could be implemented with an IBM 3494 tape library using IBM 3590 drives, all of which are available from IBM Corporation. Using the storage area network 118 permits coupling a large number of storage devices to the hosts 102, 104. In some examples the ITSRM server 106, and/or the CIM server 107 could also be coupled to the SAN 118. As an example, the storage area network 118 may be implemented using Fibre Channel network(s) and/or Ethernet network(s).

II. Operation

In addition to the hardware embodiments described above, another aspect of the invention concerns a method for assigning storage.

A. Signal-bearing Media

In the context of FIG. 1 the method aspect of the invention may be implemented, for example, by having the host 102, the host 104, the ITSRM Server 106, and/or the CIM server 107 execute a sequence of machine-readable instructions, which can also be referred to as code. These instructions may reside in various types of signal-bearing media. In this respect, one aspect of the present invention concerns a programmed product, comprising a signal-bearing medium or signal-bearing media tangibly embodying a program of machine-readable instructions executable by a digital processing apparatus to perform a method for assigning storage.

Figure 2:
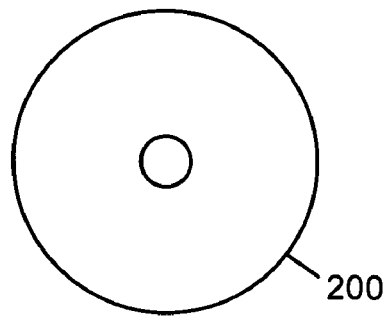
FIG. 2 is an example of a signal-bearing medium in accordance an example of the invention.

This signal-bearing medium may comprise, for example, primary memory 112 and/or non-volatile memory 114, primary memory 122 and/or non-volatile memory 124, primary memory 132 and/or non-volatile memory 134, and/or primary memory 142 and/or non-volatile memory 144. Alternatively, the instructions may be embodied in a signal-bearing medium such as the optical data storage disc 200 shown in FIG. 2. The optical disc can be any type of signal bearing disc or disk, for example, a CD-ROM, CD-R, CD-RW, WORM, DVD-R, DVD+R, DVD-RW, or DVD+RW. Additionally, whether contained in the computing system 100, or elsewhere, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", or may comprise Java bytecode.

B. Overall Sequence of Operation

Figure 3A:
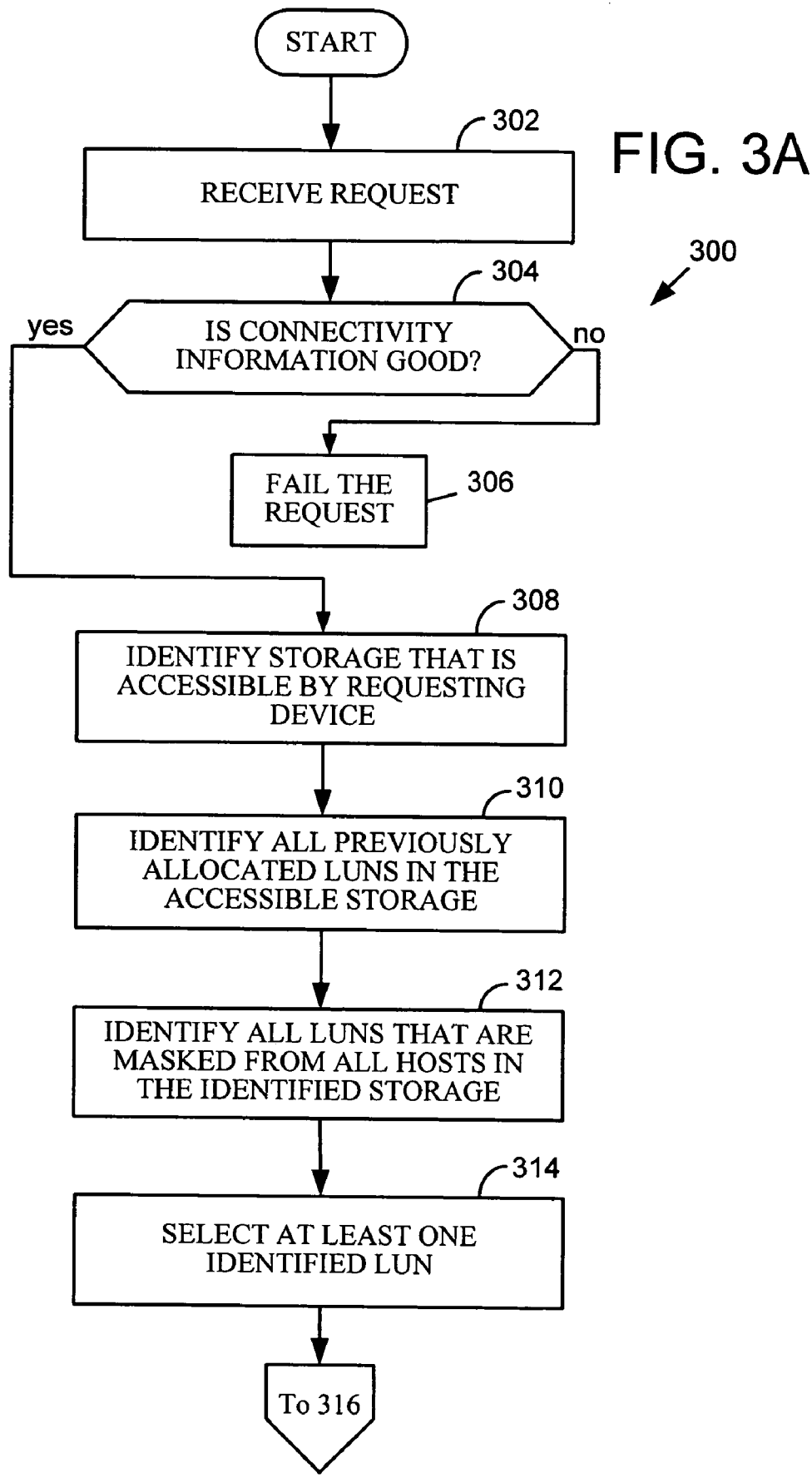

For ease of explanation, but without any intended limitation, the method aspect of the invention is described with reference to the computing system 100 described above and shown in FIG. 1. An example of the method aspect of the present invention is illustrated in FIGS. 3A and 3B, which show a sequence 300 for a method for assigning storage. Assigning storage (or a resource) may also be called mapping storage (or a resource). The resource may generally be any resource in a computing system. The method may also be described as a method for provisioning existing resources. As an example, the operations in the sequence 300 may be performed by the ITSRM server 106. However, the sequence 300 could be performed by either of the hosts 102, 104, or by the CIM server 107, or by some other computing device. Referring to FIG. 3A, the sequence 300 may include, and begin with, operation 302 which comprises receiving a request for storage, wherein the request includes a requested amount of storage space and connectivity information. The request is received by an example of the service of the invention. The connectivity information is the information needed to connect the requesting host to an existing LUN in the storage subsystem that is masked from all hosts 102, 104. Connectivity information may be obtained from a model LUN, which is a LUN anywhere in the SAN 118 that can be connected to the requesting device. Thus, an existing LUN connected to the SAN 118 can be used to map an available LUN. This may be accomplished by retrieving the host paths to the model LUN. For example, a path to a model LUN may include the target Fibre Channel Port of the path on a disk storage system, and the World Wide Name (WWN) of the host port adapter or HardwareAccount. This eliminates the need to create a cloned controller and a new HardwareAccount. The node or ports of the host hardware bus adapters 116, 126 are equivalent to hardware account objects defined in the Bluefin specification, and the storage subsystem fibre channel ports or ports are equivalent to the fibre channel port objects defined in the Bluefin specification. Depending on the masking and mapping model used, accessibility information (such as Read/Write, Read only, etc.) may then be used to create the connection of the hardware accounts to the fibre channel ports. Only the AttachDevice method in the AuthorizationService object need be used to map a storage volume (or LUN) to all of the host paths from the model LUN. The AttachDevice method may be called using the controller, the LUN, and the AuthorizationService. A successful attachment then allows the host 102, 104 to use the LUN.

Prior to the request being sent to the service, a requesting device, such as a host 102, 104, asks for a resource, such as additional storage. The host 102, 104 may ask the ITSRM running on the ITSRM server 106, for the resource. The ITSRM determines whether it has received connectivity information from the requesting host 102, 104, which for example, may be obtained from information concerning a LUN (a model LUN) that is already mapped from a storage subsystem to the host 102, 104, which an unmasked LUN requires to become mapped. If the ITSRM has not received connectivity information, the ITSRM uses a CIM Client Application, which may be a component of the ITSRM Server 106 or may run on the requesting host 102 or 104, to provide to the CIM server 107, the LUN of a LUN that is already mapped to the host 102, 104, and requests the connectivity information from the CIM server 107. The ITSRM receives the connectivity information from the CIM server 107, and sends the connectivity information and the requested amount of storage in a request to the service (which implements an example of the invention). The service may be running on the ITSRM server 106. Generally, the service may run on the host 102, the host 104, the ITSRM server 106, the CIM server 107, or on another computing device. The service receives the request and inputs the information in the request, for example the requested amount of storage space and the connectivity information. The ITSRM also starts a CIM Client Application, which for example, may run on the requesting host 102 or 104. As an example, the requesting device may be a host 102, 104, and the request may be a request for a file system extension, which is a request for additional storage to make a file system larger. Alternatively, the request may originate from a manual submission from a user. In another alternative example, the request may originate from an automated process associated with an external tool, and may be, for example, a request for storage based on a report, in contrast to a typical file system extension request originating from a host 102, 104.

The request may also specify the number of LUNs desired for the storage, for example when the storage is spread across several RAID volumes. If only one LUN is requested, one or more LUNs may be assigned in response to the request. If more than one LUN is requested, then the requested number of LUNs is assigned in response to the request. In some embodiments a storage pool, or storage pools, in which the requested amount of storage resides will be specified in the request. A pool of storage may be created from a group of LUNs. A LUN is a storage element that a host 102, 104 sees as a single storage device, but a LUN does not necessarily include only a single physical storage device. A LUN could be portions of several physical devices, such as the storage devices 150a-d. Generally, a LUN could be defined for any type of storage device or storage devices.

The sequence 300 may also include operation 304, which comprises determining if the connectivity information is good, and if it is determined that the connectivity information is not good, then the sequence may also include operation 306, which comprises failing the request. If in operation 304 it is determined that the connectivity information is good, then the sequence may also include operation 308, which comprises identifying storage that is accessible by the requesting device based on the connectivity information. In some embodiments the operation 308 of identifying storage that is accessible by the requesting device based on the connectivity information may comprise identifying all storage devices in a SAN 118 that are accessible by the requesting device, or may comprise identifying storage pools that are accessible by the requesting device. In some embodiments a storage pool in which the requested amount of storage resides will be specified in the request, and if that is the case, then the operation of identifying storage that is accessible by the requesting device based on the connectivity information may comprise identifying only storage in the storage pool specified in the request.

The sequence 300 may also include operation 310, which comprises identifying all previously allocated LUNs in the storage that is identified as being accessible by the requesting device. The sequence 300 may also include operation 312, which comprises identifying all LUNs that are masked from all hosts, in the identified storage. A masked LUN is a LUN that has been created but which has not been assigned. The sequence 300 may also include operation 314, which comprises selecting at least one identified LUN. Operation 314 may include using a best fit algorithm for selecting the at least one identified LUN. If the request specifies that the requested storage must be in certain storage pool(s) or in certain storage system(s), then the best fit algorithm may use only LUNs in the specified storage pool(s) or storage system(s). The selected LUNs may be in the same, or different, storage systems.

Referring to FIG. 3B, the sequence 300 may also include operation 316, which comprises assigning the at least one selected LUN to the requesting device. Generally, a LUN must be assigned (which is also referred to as being unmasked), to make the LUN available to a host 102, 104, to permit connecting the host hardware bus adapter 116, 126 to Fibre Channel ports on the storage system controller associated with the LUN. Operation 316 may comprise making at least one method call to a CIM object.

The sequence 300 may also include operation 318, which comprises determining if the operation of assigning the at least one selected LUN to the requesting device was completed successfully, and if not, the sequence 300 may include operation 320, which comprises performing the operation of assigning at least one identified LUN that was not previously assigned. A best fit algorithm may be used for assigning at least one LUN that was not previously assigned. The sequence 300 may also include operation 322, which comprises determining if the operation of assigning at least one identified LUN that was not previously assigned was successful. If it is determined that the operation of assigning at least one identified LUN that was not previously assigned, was not successful, then operation 320 may be performed again, wherein the at least one identified LUN that is assigned, comprises LUN(s) that were not previously assigned even during any previous performance of operation 320. In other words, a LUN that has been previously assigned will not be assigned again if operation 320 is repeated. If more than one LUN is required to be mapped (or assigned), then all selected mappings have to be successful. Otherwise, a new LUN or set of LUNs will be retried until all possible LUNs or LUN combinations have been exhausted. If it is determined in operation 318 or operation 322 that the assignment was successful, then the sequence 300 may also include operation 324, which comprises transmitting assignment information to the requesting device (which may be a requesting host 102, 104). The requesting device then may use the assigned LUNs.

The following is an alternative description of an example of the invention: A request to select a certain number of LUNs on a supported disk storage system for a certain specified size, along with connectivity information, is passed to an example of the service of the invention. Next, the service generates a list of storage pools in which to attempt selection of previously allocated LUNs. The storage pools on the list are the storage pools that the host requesting the storage is able to connect to, and are determined from the connectivity information. For example, the list can consist of storage pools that are accessible by a LUN that is already mapped to the host 102, 104, or can consist of all storage pools that are accessible to the storage system that has the LUN that is already mapped to the host 102, 104. The generated list may be policy based. Next, for each storage pool, a list of all LUNS previously allocated within the storage pool is generated by the service. Next, for each previously allocated LUN, the LUN is determined to be either available, because it is masked (also called unassigned) from all hosts, or unavailable, because it is unmasked (also called assigned) from at least one host. Next, the list of storage pools is passed to a mid level layer that selects all available LUNs in all of the storage pools. Next, the size and amount of LUNs requested is then used to determine exactly which (if any) available LUNs can be used for the provisioning request.

The following are examples of Higher Level Method Calls that may be used to implement examples of the invention:

generateWithinStoragePool( )—Given a LUN that is already connected to the host 102, 104, generate a list of storage pools associated to that LUN.

genrateWithinStorageSubsystem( )—Given a LUN that is already connected to the host 102, 104, generate a list of storage pools associated to that LUN and all storage pools associated within the same disk storage system.

getUnassignedLUNs( )—Given a list of storage pools, return a list of all available (masked) LUNs within every storage pool.

findRightSizeLun( )—Given a number of LUNs, a desired size, a limit to assign and a list of unassigned LUNs, return the best LUNs to use.

CIMOM is an industry standard for managing many resources. Consequently, any resources managed by CIMOMs may benefit by a CIM Utility as described herein for some examples of the invention. Consequently, although some examples of the invention may be used for provisioning previously allocated LUNS through the abstraction of CIM objects, other examples of the invention may be used for assigning another type of resource to a requesting client.

The complexity of the CIM object model makes it difficult for a CIM Client Application to simply locate available, masked or unassigned storage LUNs in a disk storage system. To solve this problem, some examples of the invention are a mid-level abstraction of the steps for locating these LUNs on a disk storage system, to satisfy requests for storage space using available LUNs on different disk storage systems. This makes it possible for the caller of the mid-level abstraction to know little or nothing of the CIM object model. In other words, a benefit of many examples of the invention is that an application that requests a resource such as additional storage, for example by requesting a desired size and number of available storage LUNs, which are to be selected through a CIMOM server, does not require knowledge of the CIM objects and their associations in the CIMOM. This is accomplished with a mid level abstraction of available LUN selection in the CIMOM, whereby the caller (for example a CIM Client Application) need only supply the selection parameters for the storage LUN(s). As an example, a request from a CIM Client may specify a high level input, that may include for example the number of LUNS (numberOfLuns), the desired size of the LUNS (desiredSize), and may also include identification of storage pools (storagePools). In response, in some examples of the invention will: (1) For all storage pools, locate available LUNs, and (2) From available LUNs, select LUNs to use. Additionally, many examples of the invention will benefit developers working on a CIM Client Application because these examples reduce development time and improve code maintainability, facilitating faster time to market for a CIM Client Application product.

Some examples of the invention may be depicted as a layer between callers (CIM Client Applications) and the CIM model, which makes it unnecessary for callers to have knowledge of CIM. Some examples of the invention may be described as an abstraction of the CIM standard, which veil objects and methods that CIM Client Applications otherwise would need to know. Thus, a simpler interface is provided. As discussed above, some examples of the invention find masked and allocated LUNs and make them available to a requesting host, and handle masking and unmasking of previously allocated LUNs.

In order for a CIM Client Application to select available LUNs with little or no knowledge of the CIM objects, some examples of the invention provide for the CIM Client Application to interface with a mid-level abstraction of CIM LUN selection. As an example, the CIM Client Application may only select a list of storage pools in which to locate the available LUNSs, based on a LUN that is already connected to the host 102, 104, and the mid-level abstraction will then provide a complete list of LUNs for each storage pool, and for each LUN indicate whether or not the LUN is controlled by one or more hosts. In this example the list of storage pools and their list of LUNS are then passed to another mid-level abstraction along with, for example, the amount and size of LUNs to select. All available LUNs within all storage pools may then be identified, and based on the desired size and number of LUNs, the available LUNs may be selected.

Some examples of the invention provide one or more of the following benefits: A CIM Client Application's code for selecting available LUNs in a CIMOM is simplified. The CIM Client Application's required knowledge of CIM is limited to access parameters. A CIM Client Application may request the selection of available LUNs based on a list of storage pools. Rather than attempting selection on each storage pool, a single list of storage pools can be passed to select the available LUNs. Lower-level CIM client API calls can be modified to use different versions of the Bluefin/SMI-S LUN Masking and Mapping Model, and the CIM Client Application can still code to the same abstraction layer with no knowledge of the changes. Generally, use of many examples of the invention permits assigning storage using less steps, less time, and less resources than otherwise would be required.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A computer-readable medium tangibly embodying a program of computer-readable instructions executable by a digital processing apparatus to perform a method for assigning storage, the method comprising the following operations:
   receiving at an ITSRM, a request from a requesting device, for additional storage, wherein the request includes a requested amount of storage space;
   determining if connectivity information has been received at the ITSRM from the requesting device, and if not:
      using a CIM Client Application, to provide the number of a LUN that is mapped to the requesting device, and requesting the connectivity information from a CIM server, wherein the connectivity information is a path from the requesting device to the LUN that is mapped to the requesting device;
   sending the request for the requested amount of storage space, and the connectivity information, in a request to a service;
   inputting the requested amount of storage space and the connectivity information;
   identifying storage that is accessible by the requesting device based on the connectivity information;
   identifying all LUNs that are masked from all hosts, in the identified storage;
   selecting at least one identified LUN; and
   assigning the at least one selected LUN to the requesting device.

2. The computer-readable medium of claim 1, wherein the method further comprises the operation of transmitting assignment information to the requesting device.

3. The computer-readable medium of claim 1, wherein the operation of selecting at least one identified LUN comprises using a best fit algorithm.

4. The computer-readable medium of claim 1, wherein the method further comprises the operation of identifying all previously allocated LUNs in the storage that is identified as being accessible by the requesting device.

5. The computer-readable medium of claim 1, wherein the request from the requesting device further comprises a requested number of LUNs.

6. The computer-readable medium of claim 1, wherein the operations further comprise determining if the operation of assigning the at least one selected LUN to the requesting device is completed successfully, and if not, performing the operation of assigning at least one identified LUN that was not previously assigned.

7. The computer-readable medium of claim 6, wherein the operation of assigning at least one LUN that was not previously assigned comprises using a best fit algorithm.

8. The computer-readable medium of claim 1, wherein the operation of identifying storage that is accessible by the requesting device based on the connectivity information comprises identifying all storage devices in a SAN that are accessible by the requesting device.

9. The computer-readable medium of claim 1, wherein the operation of identifying storage that is accessible by the requesting device based on the connectivity information comprises identifying storage pools that are accessible by the requesting device.

10. The computer-readable medium of claim 1, wherein the requested amount of storage is in a storage pool specified in the request, and wherein the operation of identifying storage that is accessible by the requesting device based on the connectivity information comprises identifying storage in the storage pool specified in the request that is accessible by the requesting device.

11. The computer-readable medium of claim 1, wherein the method further comprises the operation of determining if the connectivity information is good, and if it is determined that the connectivity information is not good, then the method further comprises the operation of failing the request.

12. The computer-readable medium of claim 1, wherein the requesting device is a host, and wherein the request is a request for a file system extension.

13. The computer-readable medium of claim 1, wherein the request originates as a manual request entered by a user.

14. The computer-readable medium of claim 1, wherein the request originates with an automated process associated with an external tool.

15. The computer-readable medium of claim 1, wherein the operations further comprise retrieving, the path from the requesting device to the LUN that is mapped to the requesting device, prior to performing the operation of, receiving at an ITSRM, the request from the requesting device.

16. The computer-readable medium of claim 15, wherein the path from the requesting device to the LUN that is mapped to the requesting device, includes a target Fibre Channel Port of the path on a disk storage system.

17. The computer-readable medium of claim 15, wherein the path from the requesting device to the LUN that is mapped to the requesting device, includes the World Wide Name of a host port adapter.

18. A computer-readable medium tangibly embodying a program of computer-readable instructions executable by a digital processing apparatus to perform a method for assigning storage to a requesting host, the method comprising the following operations:
   receiving at an ITSRM, a request from the requesting host, for additional storage, wherein the request includes a requested amount of storage space;
   determining if connectivity information has been received at the ITSRM from the requesting host, and if not:
      using a CIM Client Application, to provide the number of a LUN that is mapped to the requesting host, and requesting the connectivity information from a CIM server, wherein the connectivity information is a path from the requesting host to the LUN that is mapped to the requesting device;
   sending the request for the requested amount of storage space, and the connectivity information, in a request to a service;
   inputting the requested amount of storage space and the connectivity information;

identifying storage that is accessible by the requesting host based on the connectivity information;
identifying all LUNs that are masked from all hosts, in the identified storage;
selecting at least one identified LUN using a best fit algorithm;
assigning the at least one selected LUN to the requesting host; and
transmitting assignment information to the requesting host.

19. A computer-readable medium tangibly embodying a program of computer-readable instructions executable by a digital processing apparatus to perform a method for assigning a resource to a requesting device, the method comprising the following operations:
receiving at an ITSRM, a request from the requesting device, for a resource, wherein the request includes a requested quantity of the resource;
determining if connectivity information has been received at the ITSRM from the requesting device,
and if not:
using a CIM Client Application, to provide the number of a LUN that is mapped to the requesting device, and requesting the connectivity information from a CIM server, wherein the connectivity information is a path from the requesting device to the LUN that is mapped to the requesting device;
sending the request for the requested amount of storage space, and the connectivity information, in a request to a service;
inputting the requested quantity of the resource, and the connectivity information;
determining if the connectivity information is good;
identifying resources, that are accessible by the requesting device based on the connectivity information, and that are masked from all hosts;
selecting at least one identified resource, using a best fit algorithm; and
assigning the at least one selected resource to the requesting device.

20. A computing system, comprising:
a memory; and
a processing device coupled to the memory, wherein the processing device is programmed to perform operations for assigning storage to a requesting device, the operations comprising:
receiving at an ITSRM, a request from the requesting device, for additional storage, wherein the request includes a requested amount of storage space;
determining if connectivity information has been received at the ITSRM from the requesting device,
and if not:
using a CIM Client Application, to provide the number of a LUN that is mapped to the requesting device, and requesting the connectivity information from a CIM server, wherein the connectivity information is a path from the requesting device to the LUN that is mapped to the requesting device;
sending the request for the requested amount of storage space, and the connectivity information, in a request to a service;
inputting the requested amount of storage space and the connectivity information;
identifying storage that is accessible by the requesting device based on the connectivity information;
identifying all LUNs that are masked from all hosts, in the identified storage;
selecting at least one identified LUN; and
assigning the at least one selected LUN to the requesting device.

21. A computing system, comprising:
means for receiving at an ITSRM, a request from a requesting device, for additional storage, wherein the request includes a requested amount of storage space;
means for determining if connectivity information has been received at the ITSRM from the requesting device,
and if not:
using a CIM Client Application, to provide the number of a LUN that is mapped to the requesting device, and requesting the connectivity information from a CIM server, wherein the connectivity information is a path from the requesting device to the LUN that is mapped to the requesting device;
means for sending the request for the requested amount of storage space, and the connectivity information, in a request to a service;
means for inputting the requested amount of storage space and the connectivity information;
means for identifying storage that is accessible by the requesting device based on the connectivity information;
means for identifying all LUNs that are masked from all hosts, in the identified storage;
means for selecting at least one identified LUN; and
means for assigning the at least one selected LUN to the requesting device.

22. A method for assigning storage to a requesting device, comprising the following operations:
receiving at an ITSRM, a request from the requesting device, for additional storage, wherein the request includes a requested amount of storage space;
determining if connectivity information has been received at the ITSRM from the requesting device,
and if not:
using a CIM Client Application, to provide the number of a LUN that is mapped to the requesting device, and requesting the connectivity information from a CIM server, wherein the connectivity information is a path from the requesting device to the LUN that is mapped to the requesting device;
sending the request for the requested amount of storage space, and the connectivity information, in a request to a service;
inputting the requested amount of storage space and the connectivity information;
identifying storage that is accessible by the requesting device based on the connectivity information;
identifying all LUNs that are masked from all hosts, in the identified storage;
selecting at least one identified LUN; and
assigning the at least one selected LUN to the requesting device.

* * * * *